(12) United States Patent
Geens et al.

(10) Patent No.: US 11,150,428 B2
(45) Date of Patent: Oct. 19, 2021

(54) TELECOMMUNICATIONS SYSTEM AND METHODS

(71) Applicant: COMMSCOPE CONNECTIVITY BELGIUM BVBA, Kessel-Lo (BE)

(72) Inventors: Johan Geens, Bunsbeek (BE); Kristof Vastmans, Kessel-Lo (BE); Pieter Vermeulen, Westerlo (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 16/496,312

(22) PCT Filed: Mar. 20, 2018

(86) PCT No.: PCT/EP2018/057074
§ 371 (c)(1),
(2) Date: Sep. 20, 2019

(87) PCT Pub. No.: WO2018/172378
PCT Pub. Date: Sep. 27, 2018

(65) Prior Publication Data
US 2020/0271882 A1 Aug. 27, 2020

Related U.S. Application Data

(60) Provisional application No. 62/473,905, filed on Mar. 20, 2017.

(51) Int. Cl.
*G02B 6/44* (2006.01)
(52) U.S. Cl.
CPC ......... *G02B 6/4452* (2013.01); *G02B 6/4446* (2013.01); *G02B 6/4454* (2013.01)

(58) Field of Classification Search
None
See application file for complete search history.

(56) References Cited

U.S. PATENT DOCUMENTS

| 6,289,159 | B1 | 9/2001 | Van Hees et al. |
| 6,304,707 | B1 | 10/2001 | Daems et al. |
| 7,218,827 | B2 | 5/2007 | Vongseng et al. |
| 7,583,885 | B2 | 9/2009 | Kowalczyk et al. |
| 8,498,510 | B2 | 7/2013 | Bran de León |

(Continued)

OTHER PUBLICATIONS

International Search Report and Written Opinion of the International Searching Authority for International Patent Application No. PCT/EP2018/057074 dated Jun. 27, 2018, 14 pages.

*Primary Examiner* — Michelle R Connelly
(74) *Attorney, Agent, or Firm* — Merchant & Gould P.C.

(57) ABSTRACT

A cabinet having a framework for mounting telecommunications equipment includes a framework and telecommunications equipment mounted to the framework. The equipment may include splitter modules. Spools are mounted within the cabinet to manage overlength slack in fiber optic cables within the cabinet. A parking area is mounted within the cabinet and defines a plurality of cable connector storage locations for receiving at least some of the fiber optic cables. The plurality of spools are positioned intermediate the telecommunications equipment and the patch panel. A splice area is mounted within the cabinet or external to the cabinet. The splice area receives fiber optic cables for splicing to additional cables.

10 Claims, 4 Drawing Sheets

(56) References Cited

U.S. PATENT DOCUMENTS

| | | |
|---|---|---|
| 8,891,927 B2 | 11/2014 | LeBlanc et al. |
| 10,222,571 B2 | 3/2019 | Solheid et al. |
| 10,444,462 B2 | 10/2019 | Wang et al. |
| 2006/0280420 A1* | 12/2006 | Blackwell, Jr. ...... G02B 6/4441 385/135 |
| 2008/0124038 A1 | 5/2008 | Kowalczyk et al. |
| 2011/0058785 A1* | 3/2011 | Solheid ................ G02B 6/4452 385/135 |
| 2015/0355428 A1 | 12/2015 | Leeman et al. |

* cited by examiner

TELECOMMUNICATIONS SYSTEM AND METHODS

CROSS-REFERENCE TO RELATED APPLICATION

This application is a National Stage Application of PCT/EP2018/057074, filed on Mar. 20, 2018, which claims the benefit of U.S. Patent Application Ser. No. 62/473,905, filed on Mar. 20, 2017, the disclosures of which are incorporated herein by reference in their entireties. To the extent appropriate, a claim of priority is made to each of the above disclosed applications.

TECHNICAL FIELD

This disclosure concerns optical fibers and organization of optical fibers. More specifically, this disclosure concerns an arrangement to bring splicing and overlength storage into a minimum footprint between equipment, including splitter modules, and incoming fiber optic cables.

BACKGROUND

There are systems that take in subscriber or distribution cables, splice them to a pigtail cable, and then connect the cable to equipment. These systems can occupy much space. Improvements in reducing the space occupied to a minimum footprint, without losing functionality, are desirable.

SUMMARY

To address the problems of prior systems, a telecommunications system is provided. The system includes a cabinet having a framework for mounting telecommunications equipment.

Telecommunications equipment is mounted to the framework. One or more spools are mounted within the cabinet to manage overlength slack in fiber optic cables within the cabinet. A splice area is mounted within the cabinet, or external to the cabinet. The splice area receives fiber optic cables from the telecommunications equipment for splicing to additional cables. A parking area is mounted within the cabinet and defines a plurality of cable parking locations for receiving at least some of the fiber optic cables.

In one example, the equipment area and the splice area face in different directions. In a further example, the equipment area and the splice area face in opposite directions.

A plurality of spools is positioned intermediate the telecommunications equipment and the splice area in one example.

In one or more embodiments, the parking area holds connectorized cables from the splice area that are not connected to the telecommunications equipment.

In one or more embodiments, the telecommunications equipment is arranged in a vertical column.

In example implementations, the spools are arranged in a vertical column adjacent to the column of telecommunications equipment.

In example implementations, the telecommunications equipment includes at least one splitter module, with a plurality fiber optic adapter outputs.

In example implementations, the telecommunications equipment includes at least one splitter module, with at least one fiber optic adapter input.

In some examples, the telecommunications equipment comprises a plurality of splitter modules, each having adapter output.

In another aspect, a method of organizing fiber optic cable is provided. The method includes providing a cabinet including a framework for mounting telecommunications equipment; mounting telecommunications equipment to the framework; routing the fiber optic cables to the splice area mounted within the cabinet or external to the cabinet; routing overlength slack in the fiber optic cables to a plurality of spools mounted within the cabinet; connecting at least some of the fiber optic cables to a parking area mounted within the cabinet.

In example methods, the step of mounting telecommunications equipment to the framework includes mounting at least one splitter module to the framework. The step of mounting the equipment can occur after initial cabinet set up with the pigtailed patch cords stored in the parking locations.

In example methods, the step of mounting at least one splitter module to the framework includes mounting a plurality of splitter modules to the framework.

In example methods, the equipment faces in a different direction from the splices.

In other example methods, the equipment is housed in a cabinet, and the splice area is housed in a separate area, such as a sealed closure.

In example methods, there can be a step of routing a fiber to a splice tray in the splice area to provide a spliced fiber; routing the spliced fiber from the splice tray to one of the splitter modules to provide a plurality of splitter outputs in the form fiber optic adapters; routing overlength slack in the pigtails to the spools; and connecting at least some of the pigtails to the splitter outputs.

In example cabinets, the splitter inputs are located in the cabinet ready for splicing to an incoming cable to the cabinet. Cables for subscribers are positioned in the cabinet ready for splicing to subscriber or distribution cables extending to the cabinet.

All of the distribution cables can be initially located in a parking area. When a subscriber desires service, the specific subscriber cable is located in the parking area and plugged into an adapter of one of the splitters.

Splitter input cables can be initially located in a parking area. When split service is desired, a splitter input cable is connected to one of the splitters by a splitter input adapter.

The distribution pigtails can be labeled with indicia to distinguish them from each other. One example is a visual indicator, such as a number. In addition, the parking area can include indicia to identify a specific parking location for each distribution pigtail. The splitters can be identified with indicia for each splitter, and/or each input to each splitter, and/or each output for each splitter.

In addition to an indicia associated with each of the noted elements, combinations of indicia can be used to further assist with use of the cabinet and the related methods. For example, numbers and colors can be utilized. For example, each row or each column in a parking area array of parking locations or connector storage locations can be colorized to match a color associated with the distribution pigtails. Such colorization in combination with the numeric indicator makes identification of a selected parking location and/or distribution pigtail potentially easier to the user.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated herein and constitute a part of the description, illustrate several aspects of the present disclosure. A brief description of the drawings is as follows.

DETAILED DESCRIPTION

To improve the prior art, a telecommunications system is provided that provides a compact way of bringing splicing and overlength storage into a minimum footprint between equipment and incoming cable.

Figure 1:
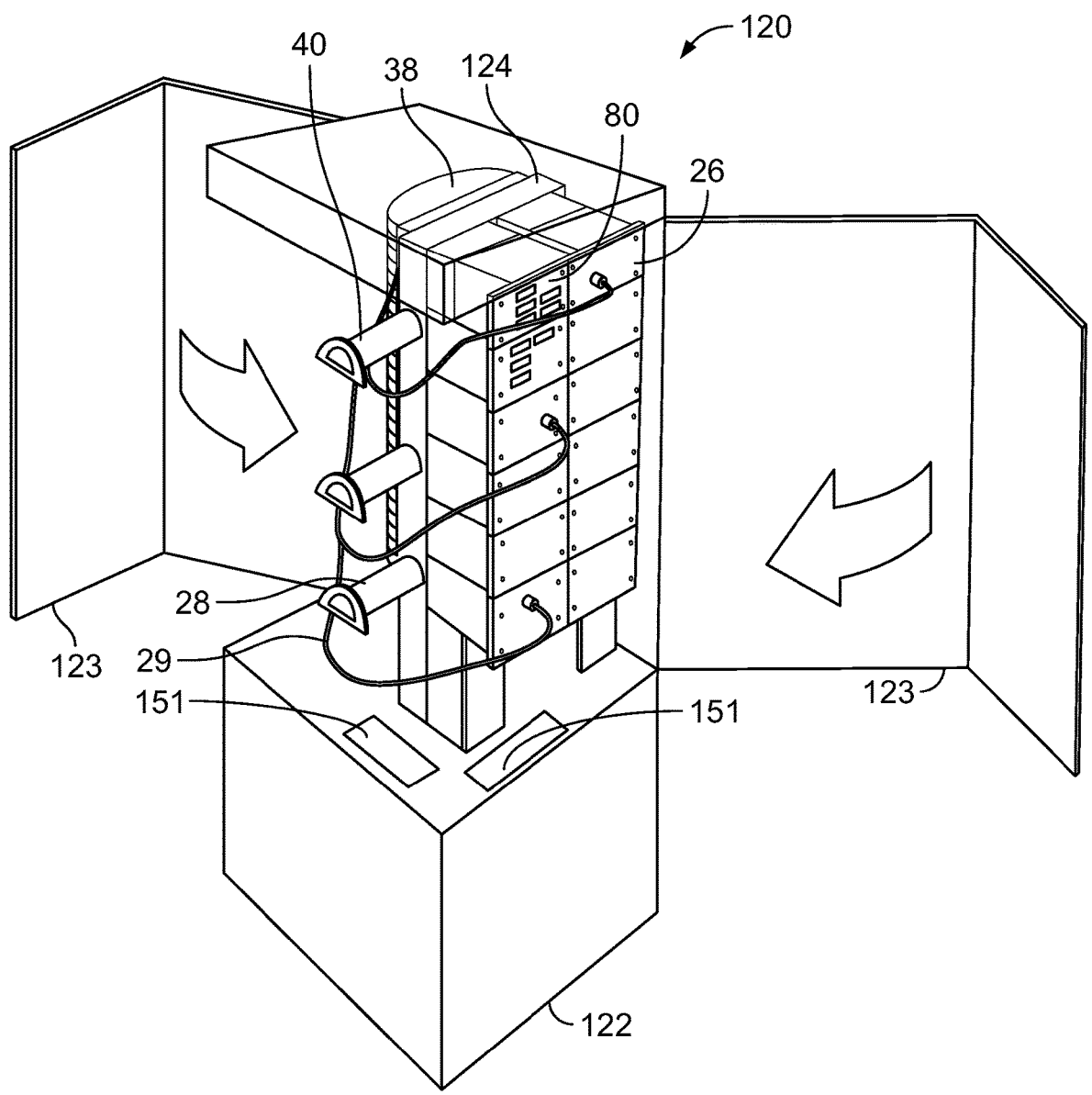
FIG. 1 is a perspective view of a first embodiment of a telecommunications system including a splice area, a parking area, and splitters.

Referring now to FIG. 1, a first embodiment of telecommunications system 120 is shown in a cabinet 122 with two doors 123 and a framework 124 for holding or mounting telecommunications equipment. Splice area 38 faces in a different direction, in this case an opposite direction, faced by telecommunications equipment 26, including splitter modules 80. Spools 28 face ninety degrees relative to splice area 38 and telecommunications equipment 26 in this example. Parking area 151 can be located anywhere convenient inside cabinet 122 for storage of the input and/or output connectorized pigtails.

Figure 2:
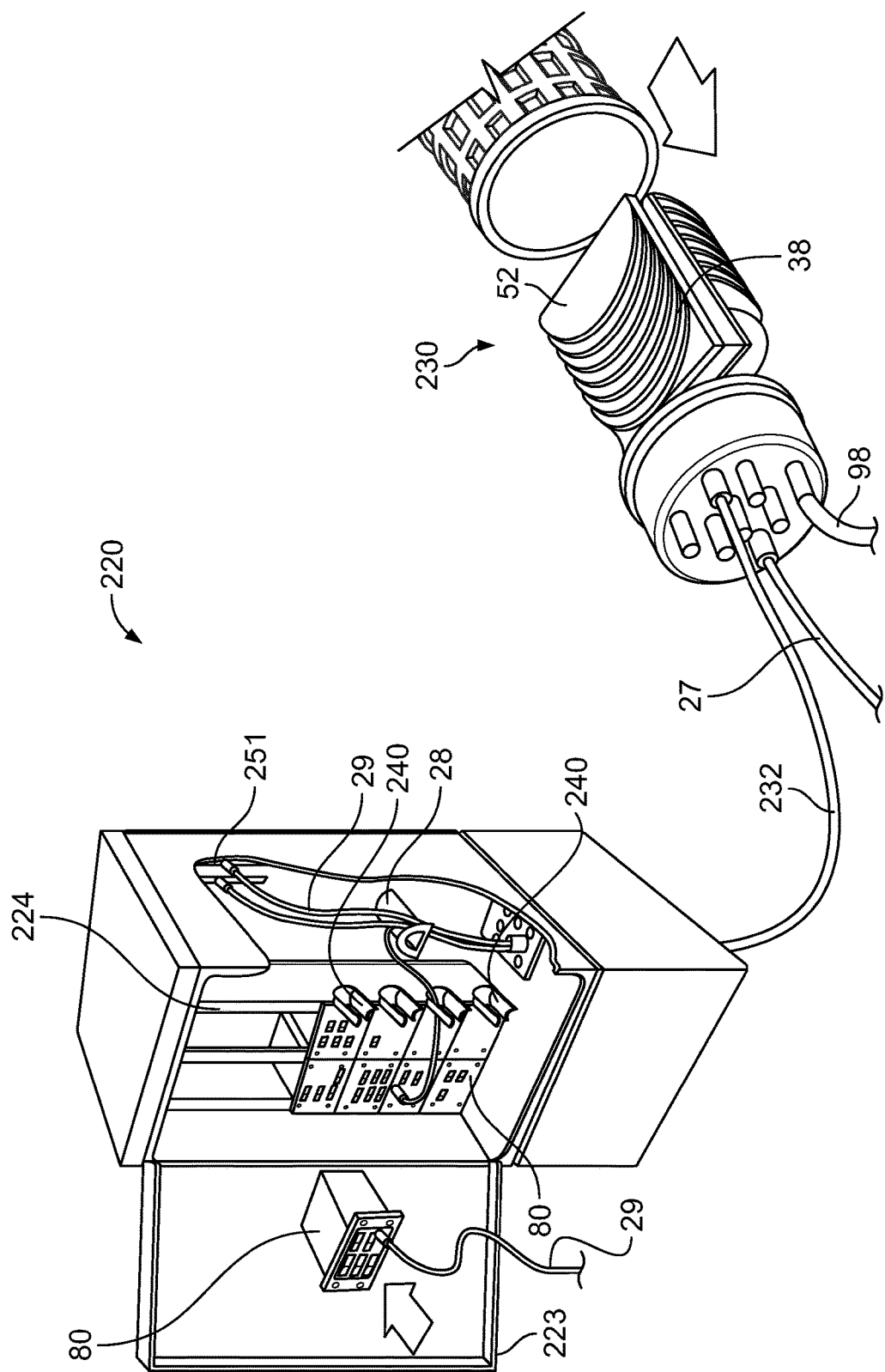
FIG. 2 is a perspective view of a second embodiment of a telecommunications system wherein the cabinet includes a parking area and splitters, and a separate closure contains the splice area.
Figure 3:
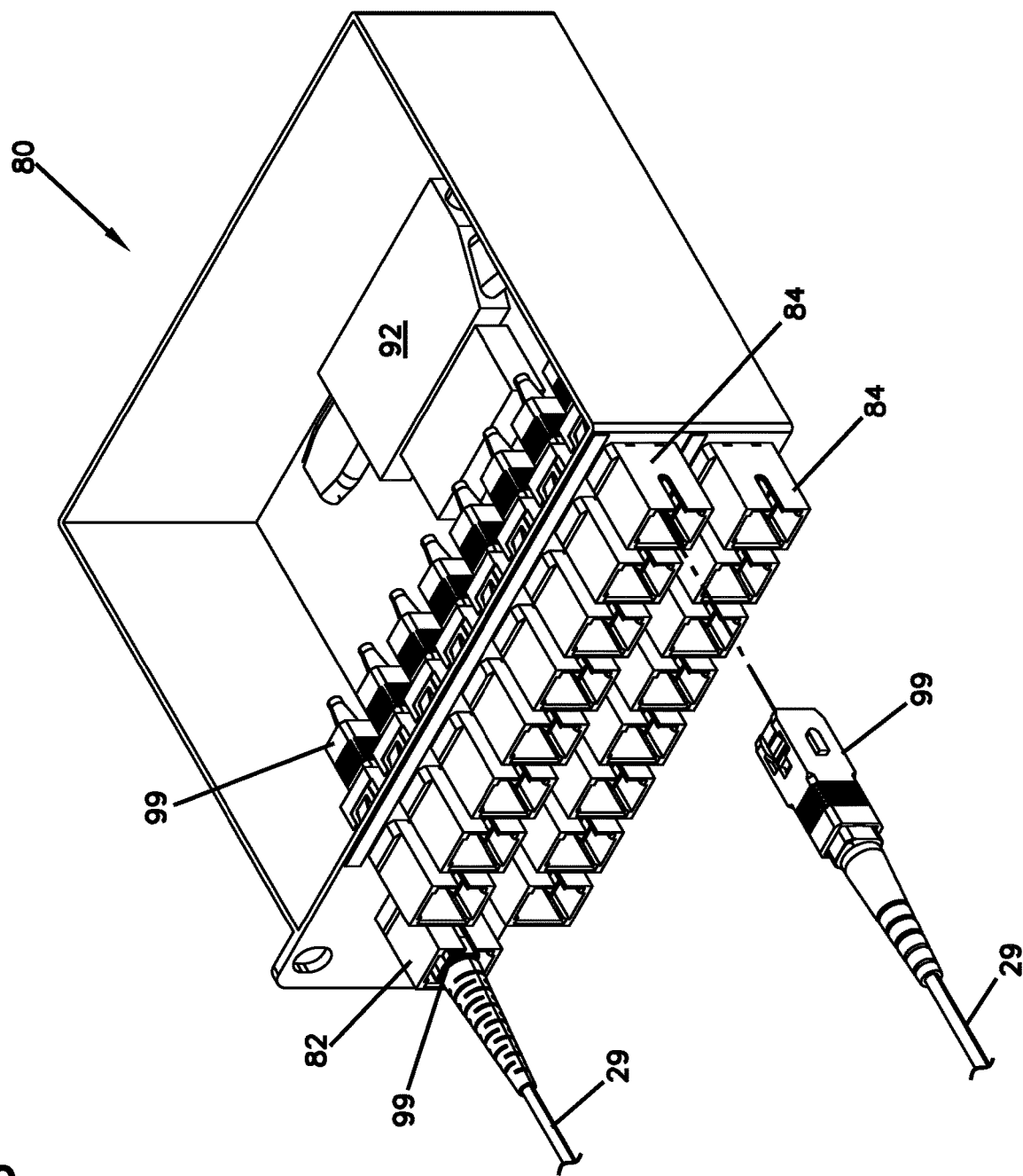
FIG. 3 is perspective view of a splitter, with a 1×16 configuration, and with a top cover removed.
Figure 4:
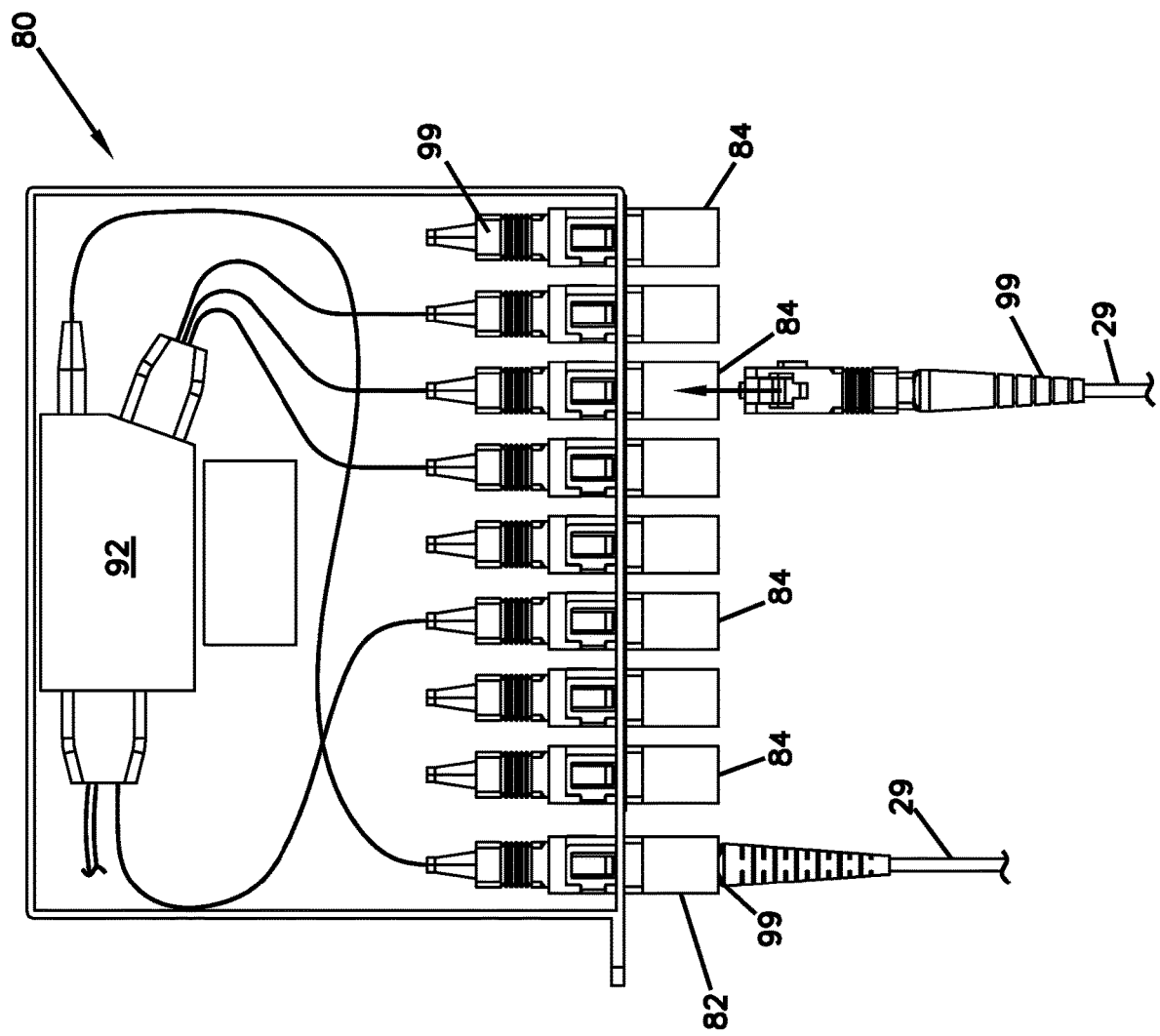
FIG. 4 is a top view of the splitter of FIG. 3.

FIG. 2 shows another embodiment of a telecommunications system 220 wherein the cabinet 222 includes a door 223, a framework 224, a parking area 251, and splitter modules 80. A separate sealed closure 230 contains the splice area 38 connected to the cabinet by a cable 232. Cable 232 is a heavier IFC style cable with a jacket, multiple inner cables, and one or more strength members. Closure 230 is sealed from the elements (e.g. water, dirt). Closure 230 is reenterable if desired to make new splices. Radius limiters 240 can be used as desired around the equipment.

The system 120 includes telecommunications equipment 26 as desired. The equipment 26 can be many different types of equipment that is used in fiber optic systems. For example, the equipment 26 can include active or passive equipment, including, e.g., a splitter, etc.

In the example of FIG. 1, the telecommunications equipment 26 is arranged in a vertical column. In general, optical fiber cable 27 will be routed from the central office to the system 120 and into the cabinet 122 from below cabinet 122 and then be connected to the equipment 26 within the cabinet 122. In FIG. 2, the cable 27 feeds closure 230.

The system 120 of FIG. 1 further includes one or more slack storage members or spools 28. The spools 28 are mounted within the cabinet 122 to manage overlength slack in the fiber optic cables within the cabinet 122. The spools 28 organize and take up overlength or slack in cables 29 from the equipment 26. The spools 28 may be the type that are described in U.S. Pat. No. 6,289,159, incorporated herein by reference.

In the example shown in FIG. 1, at least some of the spools 28 are arranged in a vertical column adjacent to the column of telecommunications equipment 26. Other arrangements and locations of spools 28 can be provided as desired.

The system 120 further includes splice area 38. The splice area 38 is mounted within the cabinet 122. The splice area 38 receives fiber optic cables from the telecommunications equipment 26 or cable connector parking area 151 and is for splicing to additional cables. In many systems, the cables then exit the cabinet 122 from below and are directed to customers. The splice area 38 can be many different embodiments including splice trays 52, such as those described in U.S. Pat. No. 6,304,707, incorporated herein by reference. See FIG. 2. Splice trays 52 are flip trays to allow selected access to the desired tray. Also, the trays 52 can be organized into zones. For example, a loop through zone (not part of this selected cabinet, but continuing to another cabinet), an incoming zone, an outgoing zone, and a point to point zone (if provided). Point to point is where a select subscriber does not have its service passing through the equipment 26. The cables may enter the splice area via troughs. Optionally, the cables may include a cable clamping device, and there may be a termination unit associated with the tray.

A storage arrangement or "parking area" 151 is provided for holding one or more unconnected cables that are not connected into the telecommunications equipment. The parking area 151 can include, for example, a housing or arrangement such as described in U.S. Pat. No. 7,218,827, incorporated herein by reference. The parking area 151 can also include, for example, any type of structure (e.g., a foam block) that uses friction to hold the unconnected cables. Cables 29 are cables that include a connectorized end and extend from the splice area 38 to either the parking area 51 or to the equipment 26.

The equipment 26 includes at least one splitter module 80. The splitter module 80 shown has at least one fiber optic adapter input 82 and a plurality of fiber optic adapter outputs 84. Splitter module 80 may contain either passive optical splitters or wavelength division multiplexers (WDM). The splitter modules 80 can be many types of configurations, and in this embodiment, the splitter modules 80 are 1×16 splitters. The internal splitter chip 92 can be either a power splitter or a WDM.

The system 120 can be used in a method of organizing fiber optic cable. The method can include providing cabinet 122 including framework 124 for mounting telecommunications equipment 26.

Next, there is a step of mounting the telecommunications equipment 26 to the framework 124.

There is a step of providing connectorized pigtails and routing overlength slack in the fiber optic cables in the cabinet to a plurality of spools 28 mounted within the cabinet 122.

There is a step of connecting at least some of the fiber optic cables into parking area 151 mounted within the cabinet 122.

The pigtails can be spliced to feeder cables for providing splitter inputs, or to distribution cables for providing splitter outputs.

The pigtails can be factory installed, with the connectors held by parking area 151, and the opposite ends of the cables held near splice area 38. Equipment 26 can be added later upon installation in the field.

Alternatively, only a portion of the equipment area of framework 124 can be filled with equipment 26. Then, at a later time, additional equipment 26 can be added as needed.

Further, cabinet 122 can be factory installed full of equipment 26, if desired.

One feature of cabinet 122 is that cables 29 can be connected to any location in parking area 151 or any location in equipment area 26. Preferably, the cables 29 are of the same length to permit easy assemble of cabinet 122.

With dual doors 123, it is possible to limit access to one side of cabinet 122. The splicing side can be secured from the connector and connecting side.

System 120 allow the customer to grow as service is desired, by adding equipment after initial set up in the field. The splices can be done at any time, either at initial system set up, or at a later date.

An example of how fiber optic cable is routed through the system 120 includes an optical fiber cable with the signal from the cable provider (central office) entering the cabinet 122. From there, the optical fiber cable can be routed to a clamp area wherein it is clamped or held with a clamp. From there, it is routed to splice area 38 and is spliced at one of the splice trays to one of the fiber pigtails 29. Pigtails 29 are cables terminated by a connector 99, such as an SC or LC single fiber connectors (or an MPO multi-fiber connector).

From there, the spliced fiber pigtail 29 is routed to the parking area 151 or to one of the splitter modules 80, where the connector 99 is plugged into a port (or adapter 82, 84) of a splitter 80, or held by parking area 151 until needed. The fiber pigtail 29 may also be held by one of the spools 28. From the splitter module 80, a plurality of further optical fibers, which are in the form of fiber pigtails 29, will extend to the splitter module 80 and then will be routed toward the splice area 38. Any overlength in the fiber pigtails 29 can be routed onto one or more of the spools 28. In addition, one or more of the fiber pigtails 29 may be placed into the parking area 151. From the splitter module 80, there can be a connection at one of the splice trays, and from the splice tray, and then routed to a user or subscriber by a cable 98. See FIG. 2.

All of the splitter input cables can be located initially in a parking area. Alternatively, the splitters can come preterminated with a cable that is spliced at splice area.

All of the distribution (subscriber) cables can be initially located in a parking area. When a subscriber desires service, the specific subscriber cable is located in the parking area, removed, and plugged into an adapter of one of the splitters. The process can be reversed if service is no longer desired for that customer.

The distribution pigtails can be labeled with indicia to distinguish them from each other. One example is a visual indicator, such as a number. In addition, the parking area can include indicia to identify a specific parking location for each distribution pigtail. The splitters can be identified with indicia for each splitter, and/or each input to each splitter, and/or each output for each splitter.

In addition to an indicia associated with each of the noted elements, combinations of indicia can be used to further assist with use of the cabinet and the related methods. For example, numbers and colors can be utilized. For example, each row or each column in a parking area array of parking locations or connector storage locations can be colorized to match a color associated with the distribution pigtails. Such colorization in combination with the numeric indicator makes identification of a selected parking location and/or distribution pigtail potentially easier to the user.

The system of FIG. 2 is different in that the feeder cable 27 and the distribution cable(s) 98 are associated with closure 230, instead of cabinet 122 in system 120 of FIG. 1. Systems 120, 220 are similar in that cabinets 122, 222 house equipment 26 (i.e, splitters 80), and the input and output pigtails 29 connecting to the equipment 26. Also, the preferred slice area 38 connects all the pigtails 29 to either input cable 27 or distribution cable(s) 98 in systems 120, 220.

The above description includes example principles. Many embodiments can be made using these principles.

What is claimed is:

1. A telecommunications system comprising:
    a cabinet including a framework for mounting telecommunications equipment;
    a telecommunications equipment area mounted to the framework;
    a plurality of cable management devices, including spools, mounted within the cabinet to manage overlength slack in fiber optic cables within the cabinet;
    a connector storage area mounted within the cabinet and defining a plurality of cable termination locations for receiving at least some of the fiber optic cables;
    a splice area mounted within the cabinet; the splice area receiving fiber optic cables for splicing to additional cables; and
    wherein the splice area faces in a different direction to the telecommunications equipment area, and the plurality of cable management devices face ninety degrees relative to the splice area and the telecommunications equipment area.

2. The system of claim 1, wherein the splice area splices a plurality of connectorized pigtails used as equipment inputs from a service provider.

3. The system of claim 1, wherein the splice area splices a plurality of connectorized pigtails used as equipment outputs to subscriber lines.

4. The system of claim 1, wherein the telecommunications equipment includes at least one splitter module.

5. The system of claim 4, wherein the at least one splitter module includes at least one adapter input.

6. The system of claim 4, wherein the at least one splitter module includes a plurality of adapter outputs.

7. The system of claim 1, wherein the telecommunications equipment comprises a plurality of splitter modules.

8. A method of organizing fiber optic cables, the method comprising:
    providing a cabinet including a framework for mounting telecommunications equipment;
    routing overlength slack of the fiber optic cables in the cabinet to a plurality of cable management devices mounted within the cabinet;
    connecting at least some of the fiber optic cables into a connector storage location mounted within the cabinet; and
    routing fiber optic cables from the connector storage location to a splice area mounted within the cabinet which faces in a different direction to the telecommunications equipment, and to the plurality of cable management devices which face ninety degrees relative to the splice area and the telecommunications equipment.

9. The method of organizing fiber optic cables of claim 8, further comprising:
    mounting the telecommunications equipment in the framework.

10. The method of organizing fiber optic cables of claim 9, further comprising;
    removing at least one subscriber fiber optic cable from the connector storage location; and connecting a connector of the fiber optic cable to the telecommunications equipment in the framework.

\* \* \* \* \*